Jan. 10, 1956    M. B. LUCKER ET AL    2,730,203
DISC BRAKE AND THRUST MEANS FOR ACTUATING THE SAME
Filed Nov. 3, 1950
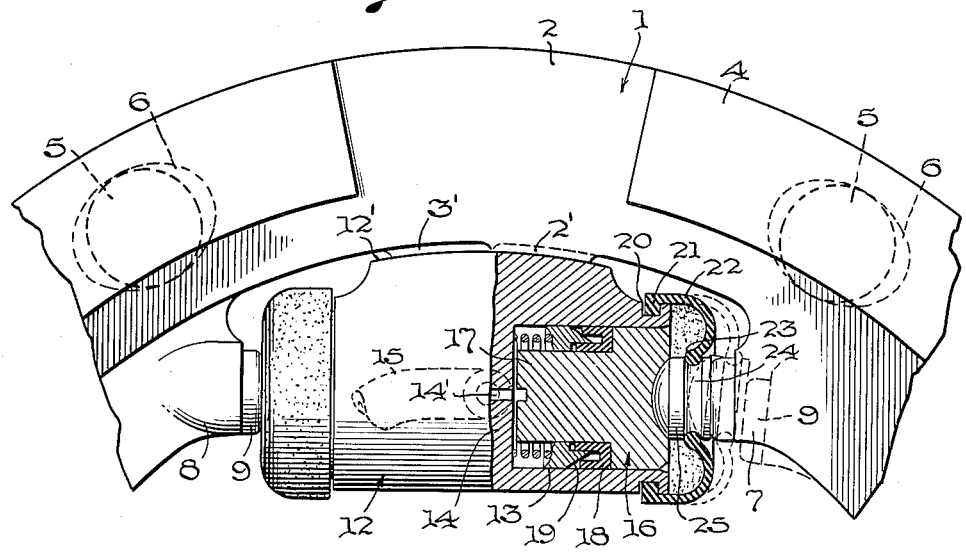
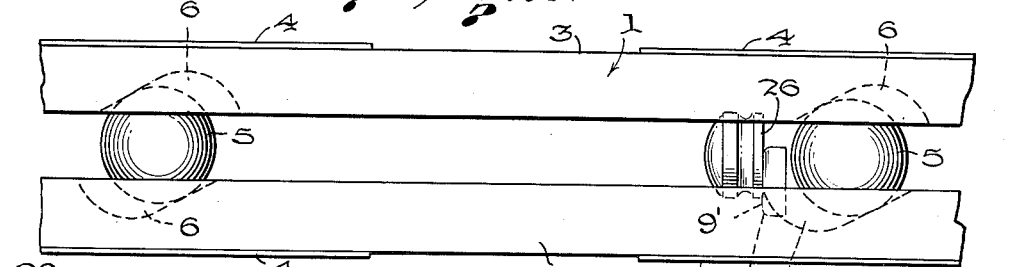
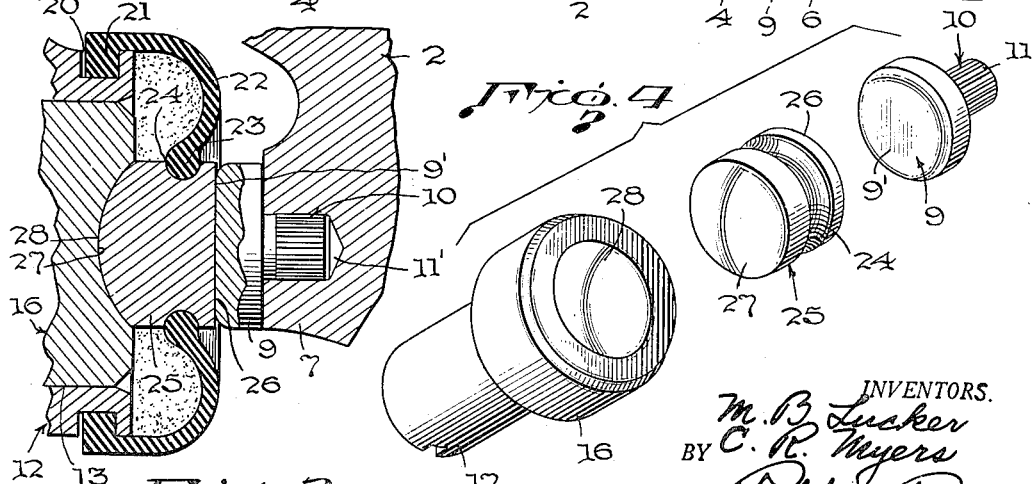
INVENTORS.
M. B. Lucker
C. R. Myers
BY Robbt Cobb
Attorneys.

United States Patent Office 2,730,203
Patented Jan. 10, 1956

2,730,203

DISC BRAKE AND THRUST MEANS FOR ACTUATING THE SAME

Millard B. Lucker, St. Joseph, and Claude R. Myers, Galien, Mich., assignors, by mesne assignments, to Lambert-Brake Corporation, St. Joseph, Mich., a corporation of Michigan Application November 3, 1950, Serial No. 193,968

3 Claims. (Cl. 188—152)

The present invention appertains to thrust transmitting means for fluid-operated actuator cylinders, and more particularly, to an improved thrust transmitting means for actuators of the type utilized in brakes for motor vehicles and the like.

The thrust means herein described may be utilized to considerable advantage in many types of brakes, but it is particularly adaptable for use with brakes of the disc type.

A typical disc brake is more particularly shown and described in detail in the co-pending application Serial No. 138,221, filed January 12, 1950, now Patent No. 2,633,943, issued April 7, 1953, and generally includes a rotatable housing to be braked, a relatively stationary, inner double-disc assembly, actuator means engageable with each disc of said double-disc assembly for effecting relative rotative movement of the discs, camming means between the discs for effecting axial separation of said discs responsive to relative rotative movements thereof, and means biasing said discs towards each other. If desirde, this type of brake may also be provided with self-adjusting means for maintaining a uniform release or running clearance between the friction discs and outer housing throughout the life of the friction lining with which they are provided.

Perfect brake action in this type of brake, as well as in other types, is sometimes materially hindered by friction and by misalignment of the brake parts that often cause unequal torque output or braking action, thereby interfering with the delicate balance of the brake system, as in especially essential in brakes for automotive vehicles.

In motor vehicle brakes particularly, the ratio of the braking effort between all wheels must remain constant throughout the life of the brake in order to protect the vehicle and its occupant from the dangers of unequal braking force on any of the vehicle wheels. It is also desirable to maintain a uniform pedal effort throughout the life of the brake, thereby minimizing the likelihood of over-control or confusion on the part of the operator when making an emergency stop.

In disc brakes of the type hereinbefore referred to, the relative movement between the movable discs and the contacting portion of the actuating means is substantially different from that of corresponding elements of other well-known brakes. In these disc brakes, the thrust of the brake actuating wheel cylinders varies from an axially aligned thrust position to an angular thrust position responsive to rotation of the discs, and the thrust is also laterally offset at the point of contact between the piston and its associated disc responsive to axial separation of the discs during braking action. This compound variation of direction of thrust progressively increases as the brake linings progressively wear down. Further variation in the line of operating thrust may be caused, in many types of brake installations, by the fact that the center-line of the rotary housing mounted on the hub or flanged axle of each vehicle wheel, may be shifted inwardly or outwardly when initially assembling or installing the brakes, due to the accumulated manufacturing tolerance which may be allowed in individual parts. Frequently this shifting may amount to as much as three-sixteenths of an inch, which in turn will shift the inner double-disc assembly a corresponding distance, by reason of the actuator cylinder or cylinders being fixedly supported by a backing or mounting plate which disposes the actuator cylinder on the mean center line of each brake.

All of these variations in the line of thrust between the brake actuator and the friction members or discs tend to cause the thrust of the actuating pistons on the inner double-disc assembly to be imparted at an angle, thereby causing side thrust and binding of the piston in its cylinder, and unequal brake torque due to side thrust on the inner disc assembly.

With the foregoing in mind, it is a primary purpose of this invention to provide novel thrust transmitting means for brakes which is so constructed and arranged as to maintain a uniform torque output of the brake throughout the life thereof.

Another object is to insure and maintain a constantly uniform pedal effort throughout the life of the brake.

A further object is to provide thrust means adapted to minimize frictional drag or resistance between the thrust imparting elements regardless of the variation of the relative angle of thrust between the thrust imparting elements when the brake is actuated.

Another object is to provide improved thrust means that will minimize frictional drag or resistance between the thrust imparting elements regardless of misalignment of the respective elements inherent in assembling or installation of the brakes.

A still further object is to provide improved thrust means to minimize side thrust on the actuating pistons and the respective braking elements, thereby insuring uniform torque output regardless of the angle of thrust of the thrust imparting means.

A further object is to provide an improved thrust transmitting element adapted to be interposed between the thrust imparting piston and the thrust receiving portion of the associated inner disc of the brake assembly, said thrust transmitting element preferably having the form of an anti-friction and self-lubricating member which is capable of universal swivel movements with respect to the brake actuating piston.

Other and further objects will hereinafter be described and the novel features thereof defined in the appended claims.

In the accompanying drawing:

Figure 1 is a fragmentary view in elevation of an inner double-disc brake assembly and actuator means therefor, a portion of the actuator means being broken away and shown in section;

Figure 2 is a view in plan of that portion of the inner double-disc assembly shown in Figure 1, and showing the displaced relation of some of the parts during braking action after the brake has substantially worn, and also representing one relative position of the thrust means and the discs that may be assumed to compensate for manufacturing tolerances on assembly of the brake;

Figure 3 is an enlarged fragmentary view in section, showing in detail the arrangement and construction of the thrust means shown in Figure 1; and Figure 4 is an exploded detail view in perspective of the thrust imparting element, the thrust transmitting element, and the thrust receiving element of a brake assembly according to this invention.

Like reference characters designate corresponding parts in the several figures of the drawing, wherein 1 generally denotes an inner double-disc assembly adapted to coopate with a rotary housing to be braked (not shown), which is generally provided with a pair of opposed annular friction surfaces disposed on opposite sides of the inner disc assembly for frictional engagement with the latter during braking action.

This inner double-disc assembly 1 comprises a pair of axially spaced annular discs 2 and 3, the outer faces of which are provided with segments of friction brake lining material 4. Interposed between these discs is a plurality of camming means 5, which in this embodiment, are hard steel balls. These balls 5 are supported between the discs 2 and 3, and seat in opposed ramped recesses 6 formed in the respective discs 2 and 3. The discs 2 and 3, with the balls 5 therebetween, are yieldingly urged axially towards each other by a plurality of springs (not shown), thereby forming a unitary inner double-disc assembly.

The disc 2 is provided with an integral lug 7, and the disc 3 is provided with a corresponding lug 8, said lugs 7 and 8 being disposed in opposed relationship when the discs 2 and 3 are assembled, as best seen in Figure 1. Each of these lugs 7 and 8 is preferably provided with a hardened wear pad 9, said wear pad having a reduced shank 10, and the shank 10 being provided with a plurality of circumferentially spaced serrations 11. The wear pads 9 are pressed or otherwise suitably rigidly secured in a recess 11' in each of the lugs 7 and 8.

A double-acting fluid-operated actuator device or wheel cylinder 12 is rigidly supported on a backing or adapter plate (not shown) which is fixedly mounted on a flanged axle or axle housing (not shown) in the case of vehicle brakes, according to whether the brake is used for a front or a rear wheel. This actuator device includes a pair of opposed piston chambers, only one of which is shown in the illustrative embodiment, and is designated 13. An intermediate wall 14 separates the opposed piston chambers, one from the other, and is provided with a fluid inlet therethrough for admitting fluid under pressure into the respective chambers as at 14'. A fluid supply line 15 interconnects the actuator device with suitable pressure fluid supplying means, such as the conventional master cylinder (not shown), which is under the control of a foot-operated pedal or the like.

Located in the chamber 13 is a thrust applying piston 16 having a reduced inwardly extending stop member 17, and a flexible seal 18 surrounds the stop adjacent the piston head 16. A spring-pressed follower or expander 19 engages the seal 18 for insuring a fluid tight seal throughout the life of the sealing gasket 18.

The hereinbefore described construction is substantially the same in both detail and function as that described in the co-pending application previously mentioned, and is only illustrative of one type of disc brake with which the present invention may be advantageously utilized.

Referring more particularly to that portion of the actuator device which is shown in section in Figures 1 and 3, it will be seen that the periphery of the actuator device 12 adjacent the outer end thereof is provided with an annular recess 20, in which is received an enlarged annular flange 21 of a sealing or dust cap 22, which is preferably made of rubber or similar flexible material, and which is adapted to protect the interior working parts of the actuator from dust, moisture and the like. The central portion of the cap 22 is provided with an annular bead 23 defining a central opening therethrough.

This annular bead 23 resiliently clamps or snaps in an annular groove 24 in the periphery of a thrust transmitting member 25 which is interposed between the piston head 16 and the wear pad 9. The thrust transmitting member 25 is preferably made of a suitable anti-friction material, such as "Oilite" or "Super Oilite" which are both wear-resistant and self-lubricating.

One end of the member 25 is provided with a flat face 26 for abutting engagement with the wear pad 9 which has a corresponding flat face 9', the opposite end of the member 25 having a partly spherical face 27 adapted for universally swivelled engagement in a corresponding recess 28 in the outer end of the actuator piston 16.

The inner double-disc assembly, as will be apparent, is an independent unit of the brake, and in assembly, it is supported by the thrust transmitting members 25, and is piloted on the arcuate top surface 12' of the actuator device 12, each of the discs 2 and 3 being provided with a cooperative radially inwardly extending projection or wear pad, as at 2', and 3', formed on the inner peripheral edge of the respective discs 2 and 3.

As previously described, the friction unit shown herein is cooperative with a rotatable housing (not shown) having annular friction surfaces on opposite sides of the disc assembly 1. Due to manufacturing tolerances, the position of the center-line of this housing may vary as much as three-sixteenths of an inch, but the actuator device 12 is fixed by means of the hereinbefore mentioned adapter plate on a mean center-line. Accordingly, the freely floating inner double-disc assembly 1, will, on assembly or installation of the brake, be shifted bodily axially on its supporting thrust members 25 to conform with the variably positioned center-line of each rotatable brake housing. In being shifted axially in this manner, the line of thrust of the pistons 16 is correspondingly shifted out of axial alignment with respect to the wear pads 9 carried by the lugs 7 and 8 on the respective discs 2 and 3. However, side thrust between the pistons 16 and the disc assembly 1 is eliminated by virtue of the flat face-to-face contact that is maintained between the flat faces 26 of the thrust transmitting members 25 and the flat faces 9' of the thrust receiving wear pads 9, as best seen in Figure 2.

The actuator device 12 shown in the accompanying drawing, and herein described in detail, is of the double-acting type, but it may be of the single acting type, and the specific construction of the actuator device may be otherwise varied without departing from the spirit of the invention, as long as the outer face of the actuator piston or pistons is provided with a partly spherical recess, as at 28, for cooperative universal engagement by the corresponding end 27 of the thrust transmitting member 25. Furthermore, the actuator device 12 may be duplicated at a diametrically opposite point of the inner double-disc assembly 1, or if desired, only a single actuator device may be utilized, as demanded by the particular use to which the brake is to be applied.

The operation of the illustrative embodiment will now be described. When fluid under pressure is supplied through line 15 into the opposed piston chambers 13 of the actuator device 12, the pistons 16 in the respective chambers are forced outwardly in opposite directions, thereby causing relative rotation of the discs 2 and 3, and causing the balls 5 to ride up the ramped seats 6, resulting in axial spreading apart of the discs 2 and 3 into engagement with the opposed friction surfaces of the rotatable housing (not shown), which, for the instant example, will be assumed to be rotating in a clockwise direction.

As indicated by the dotted lines of Figure 1, the line of thrust between the piston 16 and the wear pad 9 becomes increasingly angular as the disc 2 moves clockwise. Ordinarily, the movement would set up substantial frictional binding or resistance between the thrust members, but such frictional binding is obviated by the anti-friction, self-lubricating, thrust transmitting member 25. The flat face 26 of the thrust member 25 moves upwardly with respect to the wear pad 9, maintaining flat face-to-face contact with the flat face 9' thereof, and the thrust member 25 swivels in the recess 28 in the outer end or nose of the piston to compensate for the angular variation in the line of thrust.

By the same token, as the discs spread axially apart, the disc 2 shifts laterally or axially, as viewed in Figure 2, thereby causing further misalignment of the line of thrust which would normally cause side thrust between the piston 16 and the disc 2, with attendant reduction of braking torque.

The relative movements between the piston and the associated thrust member and wear pad at the lefthand end of the actuator 12, as viewed in Figure 1, is similar to that just described in connection with the righthand end of the actuator 12, and therefore need not be described in further detail.

It is apparent from the foregoing that we have produced a disc brake and improved thrust means for actuating the same that substantially eliminates or minimizes frictional resistance and binding between the thrust elements thereof, thereby assuring uniform braking action throughout the life of the brake, and without any need for periodic lubrication.

While the specific details have been herein shown and described, the invention is not confined thereto, as changes and alterations may be made without departing from the spirit thereof as defined in the appended claims.

We claim:

1. A friction device for brakes and the like, comprising a friction member adapted for compound rotative and axial movement into and out of engagement with a member to be braked, actuator means for imparting such movements to the friction member aforesaid, and a thrust means interposed between a portion of said actuator means and a portion of said friction member for transmitting braking forces from the actuator means to the friction member, while allowing compound rotative and axial displacement of said friction member relative to said actuator means, said thrust means comprising a thrust receiving wear pad carried on one of the portions aforesaid, said wear pad having a relatively flat face, and a thrust transmitting member having one of its ends rounded and swivelly seated in a seat in the other portion aforesaid, the other end of said thrust transmitting member having a relatively flat face in sliding engagement with the flat face on the wear paid upon movement of the friction member as aforesaid.

2. In brake mechanisms of the class described having a pair of friction discs associated with each other for relative rotative and axial shifting movements, said discs each having a force-receiving lug on its inner periphery and disposed in opposed spaced relation to the lug on the other disc, a double-acting actuator cylinder disposed between the lugs and having axially reciprocable pistons in opposite ends thereof, and a thrust member interposed between each piston and the lug on one of the discs, whereby reciprocation of said pistons in opposite directions away from each other will effect angular and axial displacement of the disc lugs relative to the respective pistons, that improvement wherein said thrust members each are provided with a flat face on one end and a partly spherical face on the other end, and the faces of said pistons and disc lugs which engage said thrust members being formed complementally to the ends of said thrust members, with said complemental flat faces slidably engaged with one another during movement of said pistons.

3. A friction device as defined in claim 1, wherein said thrust transmitting member is formed of a material having the properties of being wear-resistant and self-lubricating.

References Cited in the file of this patent

UNITED STATES PATENTS

| | | |
|---|---|---|
| 1,812,168 | Perrot | June 30, 1931 |
| 1,894,321 | Nelson | Jan. 17, 1933 |
| 1,913,932 | La Brie | June 13, 1933 |
| 2,115,961 | Main et al. | May 3, 1938 |
| 2,246,242 | Chase | June 17, 1941 |
| 2,250,608 | Sherman | July 29, 1941 |
| 2,325,944 | Frank | Aug. 3, 1943 |
| 2,330,797 | Bohannon | Oct. 5, 1943 |
| 2,336,352 | Geopfrich | Dec. 7, 1943 |
| 2,417,476 | Finley | Mar. 18, 1947 |
| 2,495,074 | Mossey | Jan. 17, 1950 |
| 2,555,651 | Lambert et al. | June 5, 1951 |
| 2,564,109 | Horowitz et al. | Aug. 14, 1951 |
| 2,575,963 | Kershner | Nov. 20, 1951 |
| 2,633,943 | Lambert | Apr. 7, 1953 |